(12) United States Patent
Hu (10) Patent No.: US 9,471,134 B2
(45) Date of Patent: Oct. 18, 2016

(54) METHOD AND APPARATUS FOR MANAGING POWER OF A STORAGE SYSTEM

(71) Applicant: International Business Machines Corporation, Armonk, NY (US)

(72) Inventor: Junjun Hu, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 129 days.

(21) Appl. No.: 14/454,890

(22) Filed: Aug. 8, 2014

(65) Prior Publication Data

US 2015/0095671 A1 Apr. 2, 2015

(30) Foreign Application Priority Data

Sep. 27, 2013 (CN) .......................... 2013 1 0450272

(51) Int. Cl.
*G06F 1/32* (2006.01)
*G06F 3/06* (2006.01)

(52) U.S. Cl.
CPC ........... *G06F 1/3268* (2013.01); *G06F 1/3221* (2013.01); *G06F 3/0625* (2013.01); *G06F 3/0634* (2013.01); *G06F 3/0649* (2013.01); *G06F 3/0689* (2013.01); *Y02B 60/1246* (2013.01)

(58) Field of Classification Search
CPC ...... G06F 1/32; G06F 1/3203; G06F 1/3215; G06F 1/3221; G06F 1/3225; G06F 1/3268; G06F 1/3287; G06F 3/0625
See application file for complete search history.

(56) References Cited

U.S. PATENT DOCUMENTS

| | | | |
|---|---|---|---|
| 8,166,270 B2 | 4/2012 | Fujibayashi et al. | |
| 8,185,754 B2 | 5/2012 | Gill et al. | |
| 8,284,627 B2 | 10/2012 | Belluomini et al. | |
| 8,291,245 B2 | 10/2012 | Nguyen et al. | |
| 8,327,177 B2 | 12/2012 | Farhan et al. | |
| 8,365,023 B2 | 1/2013 | Chiu et al. | |
| 8,370,672 B2 | 2/2013 | Thereska et al. | |
| 8,380,947 B2 | 2/2013 | Chiu et al. | |
| 2009/0031154 A1* | 1/2009 | Ikawa ................... | G06F 1/3221 713/320 |
| 2009/0254702 A1* | 10/2009 | Kumano ............... | G06F 1/3203 711/112 |
| 2013/0124814 A1* | 5/2013 | Carter .................. | G06F 1/3275 711/169 |

FOREIGN PATENT DOCUMENTS

CN 104516471 A 4/2015

OTHER PUBLICATIONS

"Samsung Green SSD—High-Performance, Energy-Efficient Storage for Today's Enterprise Computing Platforms", Samsung Semiconductor, Inc., Copyright 2011.

* cited by examiner

*Primary Examiner* — Fahmida Rahman
(74) *Attorney, Agent, or Firm* — Edward P. Li (57) ABSTRACT

A method and apparatus for managing power of a storage system are provided. The method comprises obtaining historical access information of a plurality of storage devices in the storage system within a time cycle, determining, according to the historical access information, a cold time period in the time cycle, forming a cold storage device for storing at least a part of cold data blocks within the cold time period, and setting power of the cold storage device to a low power mode in a time period of a subsequent time cycle corresponding to the cold time period. The apparatus is configured to implement the method. The method and apparatus effectively save power consumption of the storage system.

17 Claims, 4 Drawing Sheets

|  | 0(0:00-1:00) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| R1,E1 | 0 | 1 | 0 | 0 | 0 | 0 | 1 | 1 | 1 | 1 | 1 | 1 | 1 | 1 | 1 | 1 | 1 | 1 | 0 | 0 | 1 | 0 | 0 | 1 |
| .... |  |  |  |  |  |  |  |  |  |  |  |  |  |  |  |  |  |  |  |  |  |  |  |  |
| R1,EN | 1 | 0 | 0 | 1 | 0 | 0 | 1 | 0 | 1 | 1 | 1 | 0 | 1 | 1 | 0 | 1 | 1 | 1 | 0 | 0 | 1 | 0 | 0 | 0 |
| R2,E1 | 0 | 1 | 0 | 1 | 0 | 0 | 1 | 0 | 1 | 1 | 1 | 0 | 1 | 1 | 0 | 1 | 1 | 1 | 0 | 0 | 1 | 0 | 0 | 0 |
| .... |  |  |  |  |  |  |  |  |  |  |  |  |  |  |  |  |  |  |  |  |  |  |  |  |
| R2,EN | 1 | 1 | 0 | 1 | 0 | 0 | 1 | 0 | 1 | 1 | 1 | 0 | 1 | 1 | 0 | 1 | 1 | 1 | 0 | 0 | 1 | 0 | 0 | 0 |
| .... |  |  |  |  |  |  |  |  |  |  |  |  |  |  |  |  |  |  |  |  |  |  |  |  |
| RM,E1 |  | 0 | 0 | 1 | 0 | 1 | 0 | 0 | 0 | 0 | 1 | 0 | 1 | 0 | 1 | 0 | 0 | 0 | 1 | 0 | 1 | 0 | 1 | 0 |
| .... |  |  |  |  |  |  |  |  |  |  |  |  |  |  |  |  |  |  |  |  |  |  |  |  |
| RM,EN | 1 | 1 | 0 | 1 | 0 | 0 | 1 | 0 | 1 | 1 | 1 | 0 | 1 | 1 | 0 | 1 | 1 | 1 | 0 | 0 | 1 | 0 | 0 | 0 |

METHOD AND APPARATUS FOR MANAGING POWER OF A STORAGE SYSTEM

CROSS REFERENCE TO RELATED APPLICATION

This application claims the benefit of priority from Chinese Patent Application No. 201310450272.7 filed on Sep. 27, 2013, the entirety of which is incorporated by reference.

FIELD OF THE INVENTION

The present invention relates to a storage system and power supply thereof, and more specifically, to a method and apparatus for managing power of the storage system.

BACKGROUND

With the development of information technology, the amount of data that needs to be stored and processed increases dramatically. Therefore, besides improving the storage density and storage capacity of a single storage device, there is also proposed a storage system comprising a plurality of storage devices used to store data. For example, a storage array comprising a plurality of independent non-volatile storage (e.g., disk, solid state drive, etc.) may be used as the storage system, and an array set comprising a plurality of storage arrays may also act as the storage system. Due to the rapid increase in data storage needs, storage systems are loaded with more and more storage devices. For a storage system comprising a large number of storage devices, how to improve its operating performance attracts a lot of attention. Generally, in the storage system mentioned above, data is distributed on the respective storage devices. To improve the performance, some storage systems determine "hot" storage units or data blocks on the storage devices and distribute these hot data blocks evenly on different storage devices so as to avoid performance bottlenecks caused by some storage devices. Other storage systems migrate hot data blocks accessed more frequently to high-performance storage medium layers and migrate non-hot data blocks accessed less frequently to a relatively low-performance storage medium layers so as to better utilize storage performance of different media and implement high-performance storage. The evaluation on a hot data block may be based on response time of a storage unit corresponding to the data block or inputs/outputs per second (IOPS).

However, compared with the operating performance, energy consumption of the storage systems gets less consideration in previous disclosures. The energy consumption is becoming a prominent problem for storage systems loaded with a large number of storage devices. According to an existing solution, a timer is set for a storage device, which timer starts timing when the storage device enters an idle state after the completion of data access. When the timer reaches certain timing value, the storage device will be set to a low power state. In other words, when the storage device has no data access within a certain time period, it will be set to the low power state. However, for a storage system comprising a plurality of storage devices, such solution may cause respective storage devices to frequently switch between different power states, thus affecting performance of the storage devices.

SUMMARY

Embodiments of the present invention provide a method for managing power of a storage system, the storage system comprising a plurality of storage devices, each storage device comprising a plurality of storage units, each storage unit usable for storing a data block. The method comprises obtaining historical access information of the plurality of storage devices; the historical access information records status of accesses to data blocks in respective ones of the storage units on the plurality of storage devices within a time cycle. The method further comprises determining a cold time period in the time cycle, according to the historical access information; within the cold time period, a number of cold data blocks satisfies a predetermined condition. A number of accesses to each of the cold data blocks is less than an access threshold. The method further comprises forming, on the plurality of storage devices, at least one cold storage device for storing at least a part of the cold data blocks within the cold time period. The method further comprises setting power of the at least one cold storage device to a low power mode, in a time period of a subsequent time cycle corresponding to the cold time period.

Embodiments of the present invention provide an apparatus for managing power of a storage system, the storage system comprising a plurality of storage devices, each storage device comprising a plurality of storage units, each storage unit for storing a data block. The apparatus comprises a historical information obtaining unit configured to obtain historical access information of the plurality of storage devices. The historical access information records status of accesses to data blocks in respective ones of the storage units on the plurality of storage devices within a time cycle. The apparatus further comprises a cold time period determination unit configured to determine, according to the historical access information, a cold time period in the time cycle. Within the cold time period, a number of cold data blocks satisfies a predetermined condition, and a number of accesses to each of the cold data blocks is less than an access threshold. The apparatus further comprises a cold storage device forming unit configured to form, on the plurality of storage devices, at least one cold storage device for storing at least a part of the cold data blocks within the cold time period. The apparatus further comprises a power setting unit configured to set power of the at least one cold storage device to a low power mode, in a time period of a subsequent time cycle corresponding to the cold time period.

DETAILED DESCRIPTION

Some embodiments are described in more detail with reference to the accompanying drawings, in which the embodiments of the present disclosure have been illustrated. However, the present disclosure can be implemented in various ways and thus should not be construed to be limited to the embodiments disclosed herein. The embodiments are provided for thorough and complete understanding of the present disclosure by those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system". Furthermore, aspects of the present invention may take the form of a computer program product embodied in one or more computer readable medium(s) having computer readable program code embodied thereon.

Any combination of one or more computer readable medium(s) may be used. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access storage (RAM), a read-only storage (ROM), an erasable programmable read-only storage (EPROM or flash storage), an optical fiber, a portable compact disc read-only storage (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products, according to embodiments of the invention. It will be understood that each block and combinations of blocks in the flowchart illustrations and/or block diagrams can be implemented by computer program instructions. These computer program instructions may be provided to a processor of a general purpose computer, special purpose computer, or other programmable data processing apparatus to produce a machine. The instructions, which execute via the processor of the computer or other programmable data processing apparatus, create means for implementing the functions/acts specified in the flowchart and/or block diagram block or blocks.

These computer program instructions may also be stored on a computer readable medium that can direct a computer, other programmable data processing apparatus, or other devices to function in a particular way, so that the instructions stored on the computer readable medium produce an article of manufacture which includes instructions implementing the function/act specified in the flowchart and/or block diagram block or blocks.

The computer program instructions may also be loaded onto a computer, other programmable data processing apparatus, or other devices to cause a series of operational steps to be executed on the computer, other programmable apparatus or other devices to produce a computer implemented process so that the instructions which execute on the computer or other programmable apparatus provide processes for implementing the functions/acts specified in the flowchart and/or block diagram block or blocks.

Figure 1:
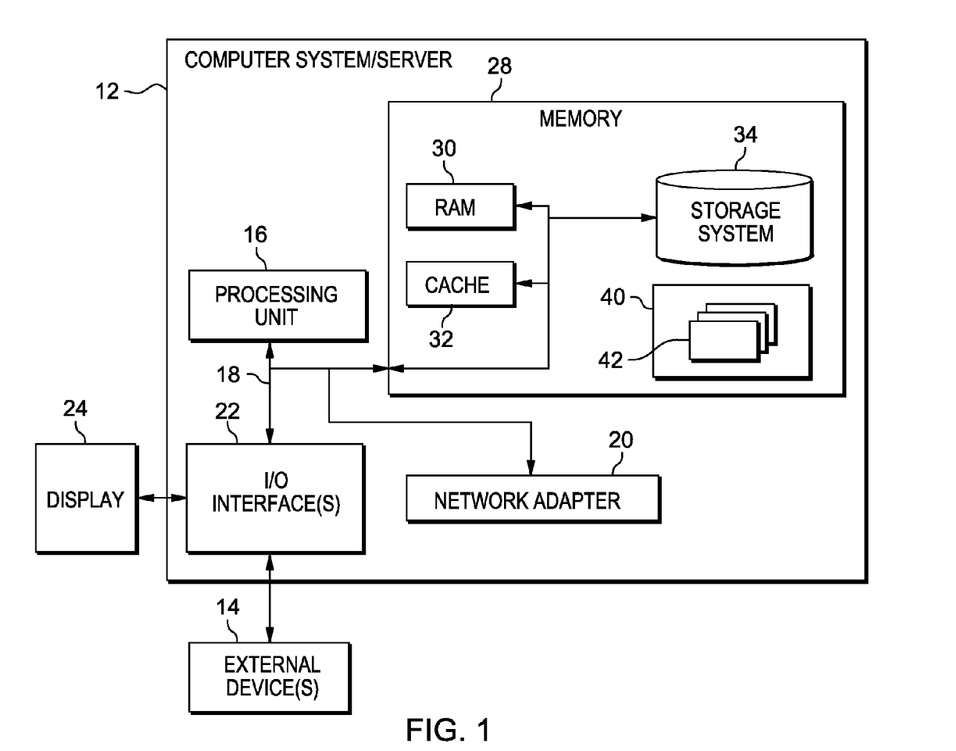
FIG. 1 is a diagram illustrating an exemplary computer system/server which is applicable to implement an embodiment of the present invention, in accordance with one embodiment of the present invention.

FIG. 1 is a diagram illustrating exemplary computer system/server 12 which is applicable to implement an embodiment of the present invention, in accordance with one embodiment of the present invention. Computer system/server 12 is only illustrative and is not intended to suggest any limitation as to the scope of use or functionality of embodiments of the invention described herein.

Referring to FIG. 1, computer system/server 12 is shown in the form of a general-purpose computing device. The components of computer system/server 12 includes, but are not limited to, one or more processors or processing units 16, memory 28, and bus 18 that couples various system components including memory 28 to processing unit 16.

Bus 18 represents one or more of any of several types of bus structures, including a storage bus or storage controller, a peripheral bus, an accelerated graphics port, and a processor or local bus using any of a variety of bus architectures. By way of example but not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12 and includes both volatile and non-volatile media, removable and non-removable media.

Memory 28 includes computer system readable media in the form of volatile storage, such as random access storage (RAM) 30 and/or cache storage 32. Computer system/server 12 may further include other removable/non-removable, volatile/non-volatile computer system storage media. By way of example only, storage system 34 is provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, including a set (e.g., at least one) of program modules 42, may be stored in memory 28 by way of example and not limitation. Program/utility 40 may further include an operating system, one or more application programs, other program modules, and program data. The operating system, one or more application programs, other program modules, program data, or some combination thereof may include an implementation of a networking environment. Program modules 42 generally carry out the functions and/or methodologies of embodiments of the invention as described herein.

Computer system/server 12 communicates with one or more external device(s) 14, such as a keyboard, a pointing device, a display 24, etc. Computer system/server 12 may communicate with one or more devices that enable a user to interact with computer system/server 12. Computer system/server 12 may further communicate with any devices (e.g., network card, modem, etc.) that enable computer system/server 12 to communicate with one or more other computing devices. Such communications can occur via Input/Output (I/O) interface(s) 22. Furthermore, computer system/server 12 can communicate, via network adapter 20, with one or more networks such as a local area network (LAN), a general wide area network (WAN), and/or a public network (e.g., the Internet). As depicted, network adapter 20 communicates with the other components of computer system/server 12 via bus 18. It should be understood that although not shown, other hardware and/or software components can be used in conjunction with computer system/server 12. Examples of the other hardware and/or software components include, but are not limited to, microcode, device drivers, redundant processing units, external disk drive arrays, RAID (redundant array of inexpensive disks) systems, tape drives, and data archival storage systems, etc.

Respective embodiments of the present invention are described below in conjunction with the accompanying drawings. In a plurality of embodiments of the invention, a cold time period with fewer accesses as well as cold data blocks less frequently accessed in the cold time period are determined according to historical access information of the storage system within a time cycle. The information about the cold time period and cold data blocks obtained may be used for predicting data access in a next time cycle. In order to enable the storage system to reduce power consumption accordingly, in case of fewer accesses, data block migration is executed based on the obtained information of the cold data blocks so as to gather cold data blocks to selected storage devices to form cold storage devices. Thus, in the next cold time period, the cold storage devices may be set in a low power mode, thereby reducing power consumption of the storage system. The mode for carrying out the concept of the present invention is described below with reference to the accompanying drawings and examples.

Figure 2:
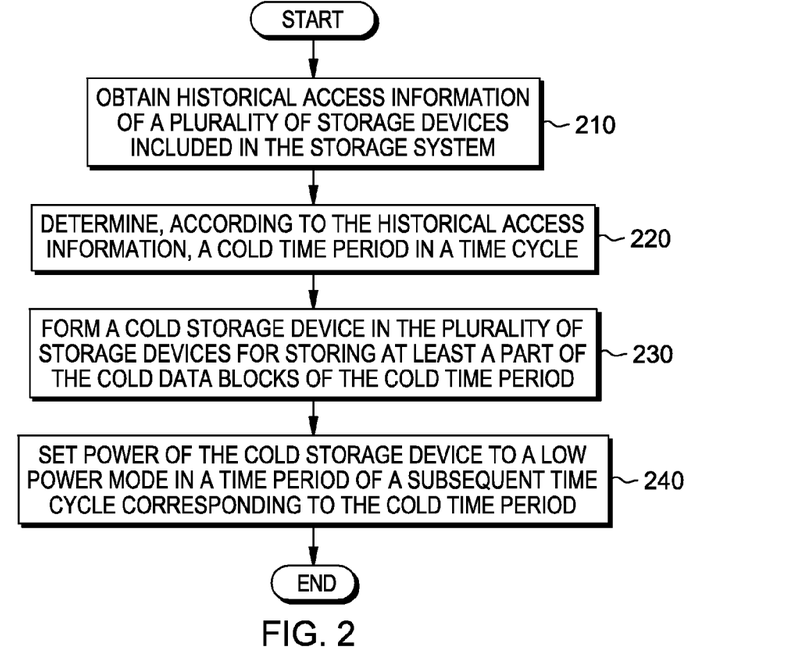
FIG. 2 is a flowchart of a power management method for a storage system, in accordance with one embodiment of the present invention.

FIG. 2 is a flowchart of a power management method for a storage system, in accordance with one embodiment of the present invention. In the embodiment, the power management method comprises the following steps. At step 210, historical information obtaining unit 610 of management apparatus 600 (shown in FIG. 6) obtains historical access information of a plurality of storage devices included in the storage system. Historical access information records status of accesses to data blocks in respective storage units in the plurality of storage devices within a time cycle. At step 220, cold time period determination unit 620 of management apparatus 600 (shown in FIG. 6) determines, according to the historical access information, a cold time period in the time cycle. Within the time cycle, the number of cold data blocks satisfies a predetermined condition. The cold data blocks are data blocks each having the number of being accessed smaller than an access threshold. At step 230, cold storage device forming unit 630 of management apparatus 600 (shown in FIG. 6) forms, in the plurality of storage devices, at least one cold storage device for storing at least a part of the cold data blocks of the cold time period. At step 240, power setting unit 640 of management apparatus 600 (shown in FIG. 6) sets power of the at least one cold storage device to a low power mode in a time period of a subsequent time cycle corresponding to the cold time period. The execution of the steps will be described below in conjunction with specific examples.

Figure 3:
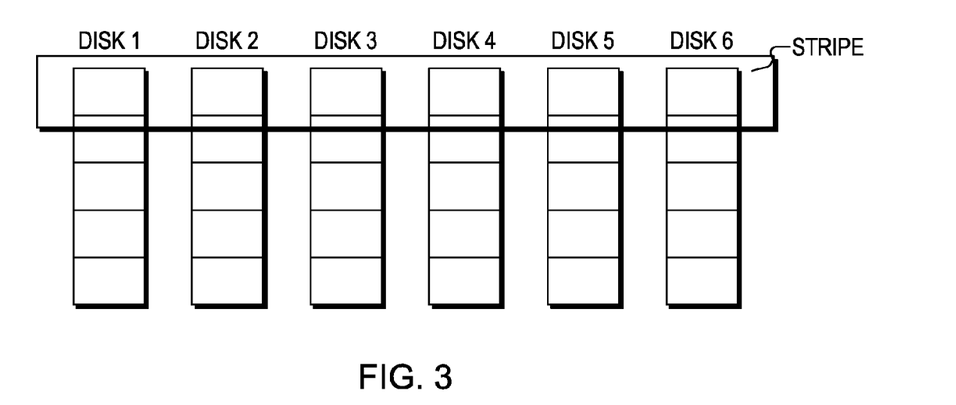
FIG. 3 is a schematic structural diagram of a RAID array of a storage device, in accordance with one embodiment of the present invention.

First, at step 210, historical access information of the storage system is obtained. The storage system includes a plurality of storage devices, each storage device includes a plurality of storage units, and each storage unit is used for storing a data block. As described above, the storage system may be embodied in many forms. In one embodiment, the storage system is a storage array comprising a plurality of non-volatile storage (e.g., disk, solid-state drive) independently reading and writing data as storage devices. Accordingly, the unit for data reading and writing in a non-volatile storage can be regarded as a storage unit thereof. In another embodiment, the storage system is an array set comprising a plurality of storage arrays. More specifically, the storage array may be, for example, a RAID (Redundant Arrays of Independent Disks) array. As to the RAID array, the commonly used array form includes RAID5 array that can tolerate one disk failure and RAID6 array that can simultaneously tolerate two disk failures. On a RAID array, typically, data is striped and distributed to different disks. FIG. 3 shows a schematic structural diagram of a RAID array. As shown in FIG. 3, the RAID array comprises a plurality of storage disks; in the example of FIG. 3, there are six disks on the array. The plurality of disks are divided into a plurality of stripes horizontally, such that each stripe contains storage chunks from the plurality of disks respectively. Accordingly, the reading and writing of data are operated on a plurality of storage chunks in a same stripe, i.e., the data reading and writing are operated in the unit of stripe which involves the plurality of disks on the array. Therefore, in the case of taking an array set comprising a plurality of RAID arrays as a storage system, each RAID array acts as a storage device described above, and a stripe on the array act as a storage unit. The data blocks formed based on the strips are also known as extents.

Although typical storage systems are described above by way of examples, it may be appreciated that the storage system may also have other or more forms and compositions, as long as it includes a plurality of storage devices and the plurality of storage devices can store data and manage power independently from each other.

For a storage system as described above, at step 210, historical access information of the plurality of storage devices included in the storage system is obtained. The historical access information records status of accesses to data blocks in respective storage units on the plurality of storage devices within a time cycle. In one embodiment, in order to obtain the historical access information, the time cycle may be divided into a plurality of time periods. Status of accesses to data blocks in respective storage units is recorded directed to respective time periods. The status, for example, is as follows: whether a data block is accessed, the number of accesses, type of access, and so on. The lengths of the time cycle and time periods may be set according to needs. In one example, the time cycle is set as 24 hours and is further divided into 24 time periods, i.e., each time period corresponds to one hour. This is particularly applicable to storage system that takes one day as a work cycle. In other examples, the time cycle may also be set as different lengths of time according to needs; for example, 8 hours, 3 days, one week, etc. and then the time cycle is divided into a plurality of time periods correspondingly. In one embodiment, when a data block is accessed for the first time in a certain time period, besides performing normal IO read/write operations, the process of recording status of accesses may comprise marking the data block as an accessed data block. In another embodiment, counters are set for respective data blocks. Within a certain time period, once a data block is accessed, the count value of a corresponding counter is incremented; when the time enters a new time period, all the counters are reset. Thereby, the number of accesses to respective data blocks on respective storage devices in each time period may be recorded as access information through the count values of the counters.

Figure 4:
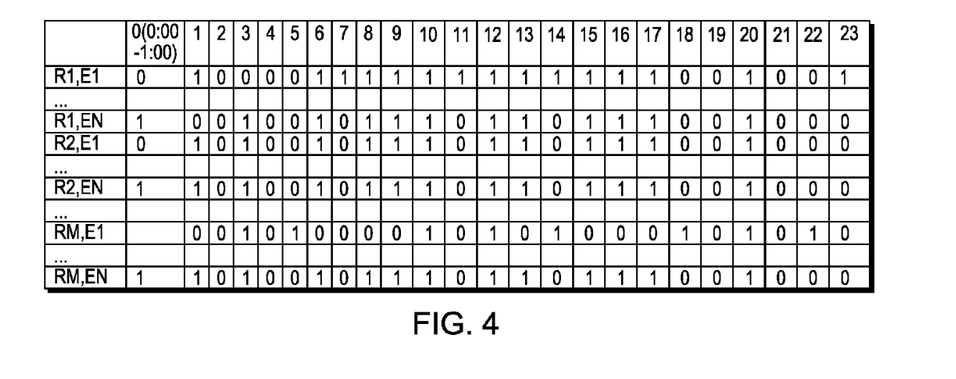
FIG. 4 is a diagram illustrating historical access information obtained, in accordance with one embodiment of the present invention.

FIG. 4 is a diagram illustrating historical access information obtained, in accordance with one embodiment of the present invention. In FIG. 4, respective time periods in a time cycle are shown in rows. As shown in FIG. 4, 24 hours are taken as one time cycle, which is divided into 24 time periods. In addition, data blocks in respective storage units of respective storage devices are shown in columns in FIG. 4; for example, (Ri, Ej) represents a data block corresponding to the j-th storage unit of the i-th storage device, or called as the j-th data block on the i-th storage device. According to the embodiment of FIG. 4, in each time period, the status of accesses to the respective data blocks is monitored, and thus the status is recorded and marked. Specifically, in the example of FIG. 4, "1" represents data blocks accessed in the corresponding time period, and "0" represents data blocks not accessed, thereby forming the historical access information shown in FIG. 4. With this historical access information, status of accesses to the data blocks on the respective storage devices in different time periods is obtained. For example, the first data block (R1, E1) on the first storage device is not accessed at the time period 0 (corresponding to the time period 0:00-1:00) and is accessed in the time period 1 (corresponding to the time period 1:00-2:00), while the last data block (R1, En) on the first storage device is accessed in time period 0 and not accessed in time period 1.

The historical access information of FIG. 4 uses "0" and "1" to mark data blocks not accessed and data blocks accessed, respectively. In other embodiments, the number of accesses to data blocks in a specific time period may also be shown directly in the historical access information. A data block having the number of being accessed smaller than an access threshold in a certain time period may be called as a cold data block of the time period, while a data block having the number of being accessed equal to or larger than the access threshold in the time period is called as a hot data block. In a typical case, the access threshold may be set to 1. In this case, a cold data block refers to a data block not accessed in the corresponding time period, and a hot data block refers to a data block accessed. In other examples, the access threshold may also be set to other small values according to needs.

It may be appreciated that the historical access information may record, in a plurality of forms, status of accesses to data blocks on respective storage devices in a predetermined time cycle. In the case that the time cycle corresponds to the work cycle of the storage system, the historical access information thus obtained often exhibits regularity related with the number of accesses. For example, an online sales site usually receives and processes a large number of browsing requests and orders in specific certain periods during the day but almost has no viewing and orders in some time periods at night. Accordingly, the number of accesses of the storage system for the online sales site reaches a lowest point at night. In the case of recording historical access information using 24 hours as the time cycle as shown in FIG. 4, there may exist some time periods with few accesses in which there are many cold data blocks and few hot data blocks. Thus, a cold time period with few accesses may be determined based on the number of cold data blocks. Such cold time period may be used as a time period for performing the power saving solution.

Specifically, at step 220, according to the obtained historical access information, a cold time period in the time cycle is determined. In the cold time period, the number of cold data blocks satisfies a predetermined condition. According to the need, the predetermined condition may be set in advance.

In one embodiment, the predetermined condition is that the total number of cold data blocks in the storage system is larger than or equal to the number of storage units included on at least one storage device. More specifically, in one example, the plurality of storage devices included in the storage system have the same capacity, i.e., the same number of storage units; thus, the predetermined condition above may be set simply to that the total number of cold data blocks is larger than or equal to the number of storage units on each storage device. In another example, the plurality of storage devices included in the storage system have different numbers of storage units; thus, the predetermined condition may be set to that the total number of cold data blocks is larger than or equal to the number of storage units included on the storage device with the smallest capacity. In some embodiments, the standard for determining the cold time period may be set more strictly; for example, the predetermined condition can be set as that the total number of cold data blocks is larger than the total number of storage units included on two or more storage devices.

It may be appreciated that, although examples of the predetermined condition for determining cold time periods are described above specifically, embodiments of determining cold time periods are not limited to those examples. Those skilled in the art may perform combinations, modifications, and substitutions based on the examples described specifically, and thus determine cold time period according to an appropriate standard based on practical needs.

On the basis of the cold time period determined, at step 230, at least one cold storage device is formed for storing cold data blocks of the cold time period. In other words, at least a part of the cold data blocks of the cold time period is stored onto at least one cold storage device, such that the at least one cold storage device does not include any hot data block of the cold time period.

Figure 5:
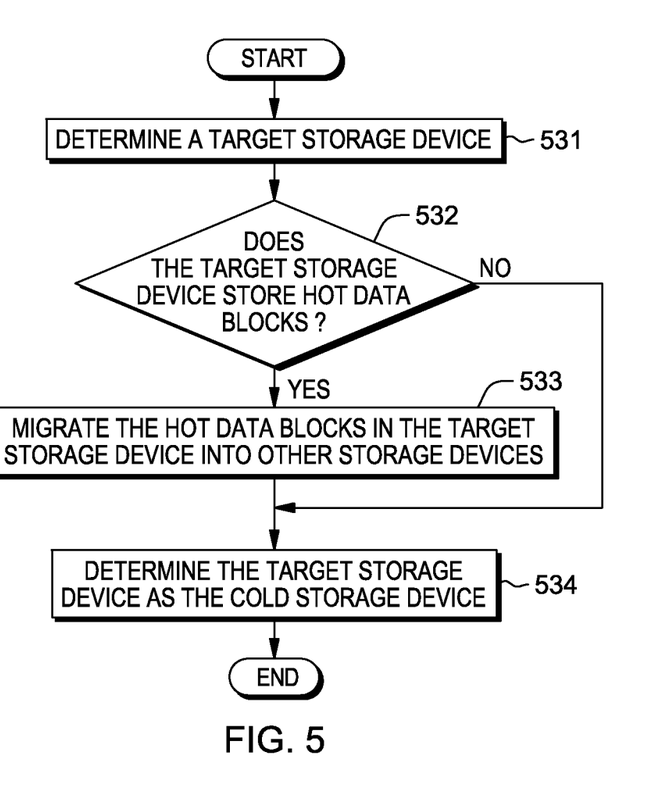
FIG. 5 is a flowchart of forming cold storage devices, in accordance with one embodiment of the present invention.

FIG. 5 is a flowchart of forming a cold storage, in accordance with one embodiment of the present invention. The flowchart shown in FIG. 5 are sub-steps of step 230 shown in FIG. 2. As shown in FIG. 5, at step 531, cold storage device forming unit 630 (shown in FIG. 6) determines a target storage device. At decision block 532, cold storage device forming unit 630 determines whether the target storage device stores hot data blocks of the cold time period. In response to determining that the target storage device stores hot data blocks of the cold time period (YES branch of decision block 532), at step 533, cold storage device forming unit 630 migrates the hot data blocks on the target storage device onto other storage devices. At step 534, cold storage device forming unit 630 determines the target storage device as a cold storage device. In response to determining that the target storage device does not store hot data blocks of the cold time period (NO branch of decision block 532), cold storage device forming unit 630 directly proceeds to step 534 to determine the target storage device as the cold storage device. The execution of the above steps is described below in conjunction with specific examples.

In one embodiment, the step of determining the target storage device includes the following processes: (1) determining at least one candidate target storage device, the number of storage units of which is larger than or equal to the total number of cold data blocks of the storage system in the cold time period and (2) selecting one or more devices from the at least one candidate target storage device as the target storage device. The predetermined condition for determining the cold time period is that the total number of cold data blocks is larger than or equal to the number of storage units included on at least one storage device; therefore, in such cold time period there certainly exists at least one storage device, the number of storage units of which is smaller than or equal to the total number of cold data blocks. Such at least one storage device can be considered as candidate target storage devices.

If there exists only one candidate target storage device, this candidate storage device can then be determined as the target storage device. If there exist a plurality of candidate target storage devices, then one or more of them can be selected as the target storage device. In one embodiment, one or more devices are randomly selected from the plurality of candidate target storage devices as the target storage device. In another embodiment, a storage device containing a maximum number of cold data blocks is selected from the plurality of candidate target storage devices as the target storage device.

In one embodiment, free blocks included on the storage devices are further considered. In such a case, a storage device, the number of storage units of which is smaller than or equal to the total number of cold data blocks of the cold time period plus the total number of free blocks, may be determined as the candidate target storage device. In such a manner it is possible to obtain more candidate target storage devices. When selecting the target storage device from the candidate target storage devices, a storage device with a maximum summation of the number of cold data blocks and the number of free blocks may be selected as the target storage device. Alternatively, a storage device including the least hot data blocks may be selected as the target storage device.

For the target storage device, at decision block 532, whether there is a hot data block stored on the target storage device is determined. If there is no hot data block stored on the target storage device, such target storage device may then be directly used as the cold storage device. However, if there is a hot data block on the target storage device, it is then needed to perform data block migration at step 533, thereby excluding the hot data block from the target storage device and making it store only the cold data blocks.

In one embodiment, free space of other storage devices than the target storage device in the storage system is sufficient to accommodate the hot data blocks on the target storage device. In this case, at step 533, it only needs to migrate the hot data blocks on the target storage device onto the free space of the other storage devices without making any data blocks moved into the target storage device. Accordingly, the storage units that originally store the hot data blocks on the target storage device become free block. However, in another embodiment, free space on the other storage devices may be not enough to store all hot data blocks on the target storage device. In this case, at step 533, in addition to moving the hot data blocks on the target storage device out, it is further required to move in cold data blocks from other storage devices, the number of which is equal to or smaller than the number of the hot data blocks. A part of the hot data blocks on the target storage device are exchanged with cold data blocks on other storage devices, so as to achieve the purpose of excluding the hot data blocks from the target storage device. Of course, it may be appreciated that in the case where free space is enough to accommodate the hot data blocks on the target storage device, it is also applicable to selectively make a part or all of the hot data blocks migrated and exchanged with the cold data blocks on other storage devices.

Through step 533, the hot data blocks on the target storage device are moved out, and the target storage device is merely used for storing the cold data blocks. Thus, the target storage device that is only used for storing cold data blocks after the data block migration may be determined as the cold storage device.

A plurality of cold storage devices may be formed as described above. However, when a subsequent cold storage device is formed, it is required to "seal off" the cold storage devices previously formed; in other words, when it is required to consider the numbers and distribution of the cold data blocks and free blocks in the process of forming a subsequent cold storage device, cold data blocks and free blocks in the code storage devices already formed are excluded. For example, when it is to determine a subsequent target storage device, only remaining cold data blocks and remaining free blocks in the storage system are considered, wherein the remaining cold data blocks are cold data blocks on storage devices other than the formed cold storage devices in the storage system, and the remaining free blocks are free blocks on storage devices other than the formed cold storage devices in the storage system. In the case where the target storage device cannot be determined, the process of forming the cold storage device is ended.

In one embodiment, a plurality of consecutive cold time periods are determined at step 220. In order to avoid reforming the cold storage device in consecutive cold time periods, at step 230, data blocks always as cold data blocks in consecutive cold time periods, called common cold data blocks hereinafter, are stored to the same cold storage device so that a part of the formed cold storage device are applicable for consecutive cold time periods. To this end, in one embodiment, to determine the target storage device, storage device in which more common cold data blocks are stored is preferably selected. In one embodiment, in the process of migrating data blocks, the common cold data blocks are migrated to the same target storage device. Furthermore, those skilled in the art may further consider the numbers and distributions of respective cold data blocks of respective cold time periods in the consecutive cold time periods to optimize the process of forming the cold storage devices.

It may be appreciated that, in the above process of forming the cold storage devices, it is usually required to conduct the migration of data blocks. Since there have been proposed a plurality of methods for migrating data blocks between different storage devices, those skilled in the art can select an appropriate way to execute the migration of data blocks so as to store the cold data blocks to the cold storage devices.

Since each of the cold storage devices formed above stores only the cold data blocks of the cold time period, it is reasonable to predict that during the next cold time period there is low probability that the cold storage device would be accessed. Therefore, at step 240 shown in FIG. 2, in a time period of a subsequent time cycle corresponding to the previous cold time period, power of the formed cold storage devices is set to the low power mode.

There are many power management ways for storage devices. For example, parameter settings or commands for the power management of single disk storage are defined in SCSI Primary Commands-4 (SPC-4) and SCSI Block Commands-3 (SBC-3), including command START STOP UNIT. With this command, power consumption of the disk can be set into different levels. These levels include, for example, from high power to low power consumption, active, idle_a, idle_b, idle_c, standby_y, and standby_z. Different disk vendors may implement the different power consumption levels by various ways, such as changing the rotating speed, etc. With the above commands and manners, power of the cold storage devices formed at step 230 can be set to a low power mode, e.g., standby_z. In a case where a storage device corresponds to a RAID array, setting the cold storage devices to a low power mode requires all the storage (e.g., disks) forming the RAID arrays of the cold storage devices to be set to a low power mode. In addition, based on various power settings manners, those skilled in the art also may use other commands and ways to achieve power saving setting of the cold storage devices.

Once set to a low power mode, the cold storage devices enter into a low power "sleep" state. Correspondingly, it is required to "wake-up" the sleeping cold storage devices in appropriate timing so that they may return to a normal work state. Thus, in one embodiment, the method of managing power of the storage system further comprises setting at least one of the cold storage devices back to a normal work state from the low power mode in response to a wake-up condition. In the embodiment, the above-mentioned wake-up condition is the end of the time period in the current time cycle corresponding to the cold time period. At this time, the cold storage devices are woken up and then return to the normal work state. In another embodiment, the above-mentioned wake-up condition is access to a data block on a cold storage device. In response to such access, the cold storage device is woken up to the normal work state. In this case, if the access occurs within the cold time period, then the cold storage device ends the sleep state in advance of the cold time period; if the access occurs after the end of the cold time period, the sleep time of the cold storage device is longer than the cold time period. In yet another embodiment, the wake-up condition can be a combination of the wake-up conditions of the above two embodiments. Specifically, if the data block access occurs within the cold time period, the cold storage device is woken up temporarily; if it is still in the cold time period when the access is completed, then the cold storage device is made to re-enter into a low power mode until the end of the cold time period. Alternatively, when the number of accesses to the cold storage device within the cold time period reaches a pre-set number of wake-up threshold, the cold storage device is woken up completely so that it enters the normal work state. In a case where a plurality of cold storage devices are formed, the plurality of cold storage devices may be woken up at different times, respectively. In yet another embodiment, the types of access to the data blocks are further considered. Specifically, the above wake-up condition is set to a read access to a data block on a cold storage device. In response to the read access, the cold storage device is set back to the normal work state from the low power mode. However, if a write access is conducted to a specific data block on a cold storage device, the cold storage device is not waken up immediately; instead, new data is written to free space on another storage device of the storage system, and an association between the logical address of the new data and the physical address of the new data block is set up and recorded. After the cold storage device is woken up for other reasons, original data in the above specific data block on the cold storage device is deleted based on an association between the logical address of the data block and the physical address of the old data block and thus ensure data integrity. Therefore, the probability of the cold storage device being woken up is further decreased, and thus the sleep time thereof is extended, thereby achieving the purpose of power saving.

Based on the above method for managing power of the storage system, a cold time period with fewer accesses may be determined according to historical access information, and cold data blocks in the cold time period are stored onto the cold storage device. Thus, when the next cold time period comes, power consumption of the storage system may be saved by setting power of the cold storage device to a low power mode.

Figure 6:
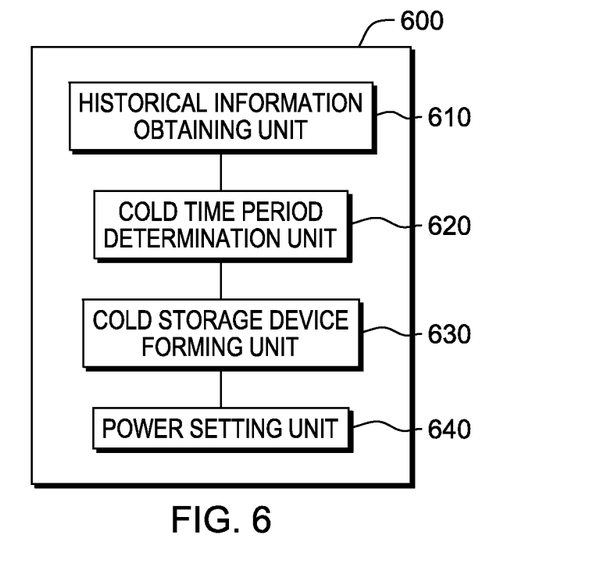
FIG. 6 is a block diagram of a management apparatus, in accordance with one embodiment of the present invention.

The present invention further provides a management apparatus for managing power of a storage system, wherein the storage system includes a plurality of storage devices, each storage device comprises a plurality of storage units, and each storage unit is usable for storing a data block. FIG. 6 is a block diagram of a management apparatus, in accordance with one embodiment of the present invention. As shown in FIG. 6, the management apparatus for managing power of a storage system is denoted by 600. Specifically, management apparatus 600 includes historical information obtaining unit 610 which is configured to obtain historical access information of the plurality of storage devices. The historical access information records status of accesses to data blocks in respective storage units on the plurality of storage devices within a time cycle. Management apparatus 600 further includes cold time period determination unit 620, which is configured to determine, according to the historical access information, a cold time period in the time cycle. Within the cold time period, the number of cold data blocks satisfies a predetermined condition, and the cold data blocks are data blocks each having the number of being accessed smaller than an access threshold. Management apparatus 600 further includes cold storage device forming unit 630, which is configured to form, on the plurality of storage devices, at least one cold storage device for storing at least a part of the cold data blocks of the cold time period. Management apparatus 600 further includes power setting unit 640, which is configured to set power of the at least one cold storage device to a low power mode in a time period of a subsequent time cycle corresponding to the cold time period.

According to one embodiment, the storage device is a RAID array, and the storage unit corresponds to a stripe in the RAID array.

According to one embodiment, the predetermined condition is one of the following: (1) total number of cold data blocks in the storage system is larger than or equal to the number of storage units included on at least one storage device of the plurality of storage devices; or (2) a summation of total number of cold data blocks and total number of free blocks in the storage system is larger than or equal to the number of storage units included on at least one storage device of the plurality of storage devices.

In one embodiment, cold storage device forming unit 630 includes (not shown in FIG. 6): a target determination module configured to determine a target storage device; a migration module configured to migrate, in a case where there are hot data blocks of the cold time period stored on the target storage device, the hot data blocks on the target storage device out to other storage devices; and a determination module to determine the target storage device not including any hot data block as a cold storage device.

According to one embodiment, the migration module is further configured to migrate cold data blocks from other storage devices to the target storage device, wherein the number of the cold data blocks is equal to or less than the number of the hot data blocks.

According to one embodiment, the target determination module is configured to determine at least one candidate target storage device. The at least one candidate target storage device satisfies one of the following: (1) the number of storage units included therein is smaller than or equal to total number of cold data blocks of the cold time period in the storage system; (2) the number of storage units included therein is smaller than or equal to total number of the cold data blocks of the cold time period plus total number of free blocks in the storage system; (3) from the at least one candidate target storage device, the target storage device is selected.

In one embodiment, the target determination module is configured to execute one of: (1) selecting from the at least one candidate target storage device a storage device that includes the maximum number of cold data blocks as the target storage device, and (2) selecting from the at least one candidate target storage device a storage device that has the maximum summation of the number of cold data blocks and the number of free blocks as the target storage device.

In one embodiment, cold time period determination unit 620 is configured to determine a plurality of consecutive cold time periods. The target determination module is configured to determine a storage device as the target storage device that stores the maximum number of common cold data blocks in the plurality of consecutive cold time periods. The migration module is configured to migrate common cold data blocks on other storage devices to the target storage device.

According to one embodiment, management apparatus 600 further comprises: a wake up unit configured to set the cold storage device back to a normal work state from the low power mode, in response to a wake up condition.

According to one embodiment, the wake up condition includes at least one of: the end of the time period corresponding to the cold time period, and an access to a cold storage device.

It may be appreciated that respective units in FIG. 6 are divided by function, and thus the respective units may be located on the same or different physical platforms.

With the method and management apparatus of the embodiments described above, a part of the storage devices in the storage system may be asleep in time periods with few accesses, thereby effectively reducing power consumption in the storage system.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing power of a storage system, the storage system comprising a plurality of storage devices, each storage device comprising a plurality of storage units, each storage unit for storing a data block, the method comprising:

obtaining historical access information of the plurality of storage devices, wherein the historical access information records status of accesses to data blocks in respective ones of the storage units on the plurality of storage devices within a time cycle;

determining according to the historical access information, a cold time period in the time cycle, within which a number of cold data blocks satisfies a predetermined condition, wherein a number of accesses to each of the cold data blocks is less than an access threshold;

determining, on the plurality of storage devices, a target storage device for forming at least one cold storage device for storing at least a part of the cold data blocks within the cold time period;

determining whether the target storage device includes at least one hot data block;

migrating the at least one hot data block on the target storage device onto other storage devices, in response to determining that the target storage device includes at least one hot data block, wherein a number of accesses to the at least one hot data block is larger than or equal to the access threshold;

migrating the cold data blocks from the other storage devices to the target storage device, in response to determining that the number of the cold data blocks on the other storage devices is equal to or less than a number of the hot data blocks on the target storage device; and setting power of the at least one cold storage device to a low power mode, in a time period of a subsequent time cycle corresponding to the cold time period.

2. The method of claim 1, wherein the predetermined condition is one of:

the number of the cold data blocks in the storage system being larger than or equal to a number of the storage units included on at least one of the plurality of storage devices; and a summation of the number of cold data blocks and a number of free blocks in the storage system being larger than or equal to the number of the storage units included on the at least one of the plurality of storage devices.

3. The method of claim 1, further comprises:
determining the target storage device as the at least one cold storage device, in response to determining that the target storage device does not include any hot data block.

4. The method of claim 1, wherein the step of determining the target storage device comprises:
determining at least one candidate target storage device, wherein the at least one candidate target storage device satisfies one of: the number of the storage units included thereon being smaller than or equal to the number of the cold data blocks during the cold time period in the storage system, and the number of the storage units included thereon being smaller than or equal to the number of the cold data blocks during the cold time period plus a number of free blocks in the storage system; and
selecting the target storage device from the at least one candidate target storage device.

5. The method of claim 4, wherein the step of selecting the target storage device comprises one of:
selecting, from the at least one candidate target storage device, a storage device that includes a maximum number of the cold data blocks as the target storage device; and
selecting, from the at least one candidate target storage device, a storage device that has a maximum summation of the number of the cold data blocks and the number of the free blocks as the target storage device.

6. The method of claim 1, further comprising:
determining a plurality of consecutive cold time periods;
determining a storage device that stores a maximum number of common cold data blocks in the plurality of consecutive cold time periods as the target storage device; and
migrating the common cold data blocks on the other storage devices to the target storage device.

7. The method of claim 1, further comprising:
setting the at least one cold storage device from the low power mode to a normal work state, in response to a wake-up condition.

8. The method of claim 7, wherein the wake-up condition comprises at least one of: an end of a time period corresponding to the cold time period, and an access to a cold storage device.

9. An apparatus for managing power of a storage system, the storage system comprising a plurality of storage devices, each storage device comprising a plurality of storage units, each storage unit for storing a data block, the apparatus comprising:
a historical information obtaining unit configured to obtain historical access information of the plurality of storage devices, wherein the historical access information records status of accesses to data blocks in respective ones of the storage units on the plurality of storage devices within a time cycle;
a cold time period determination unit configured to determine, according to the historical access information, a cold time period in the time cycle, within which a number of cold data blocks satisfies a predetermined condition, wherein a number of accesses to each of the cold data blocks is less than an access threshold;
a cold storage device forming unit configured to determine, on the plurality of storage devices, a target storage device for forming at least one cold storage device for storing at least a part of the cold data blocks within the cold time period;
the cold storage device forming unit configured to determine whether the target storage device includes at least one hot data block;
the cold storage device forming unit configured to migrate the at least one hot data block on the target storage device onto other storage devices, in response to determining that the target storage device includes the at least one hot data block, wherein a number of accesses to the at least one hot data block is larger than or equal to the access threshold;
the cold storage device forming unit configured to migrate the cold data blocks from the other storage devices to the target storage device, in response to determining that the number of the cold data blocks on the other storage devices is equal to or less than a number of the hot data blocks on the target storage device; and
a power setting unit configured to set power of the at least one cold storage device to a low power mode, in a time period of a subsequent time cycle corresponding to the cold time period.

10. The apparatus of claim 9, wherein the predetermined condition is one of:
the number of the cold data blocks in the storage system being larger than or equal to a number of the storage units included on at least one of the plurality of storage devices; and
a summation of the number of cold data blocks and a number of free blocks in the storage system being larger than or equal to the number of the storage units included on the at least one of the plurality of storage devices.

11. The apparatus of claim 9, the cold storage device forming unit further configured to determine the target storage device as the at least one cold storage device, in response to determining that the target storage device does not include any hot data block.

12. The apparatus of claim 9, the cold storage device forming unit further configured to:
determine at least one candidate target storage device, wherein the at least one candidate target storage device satisfies one of: the number of the storage units included thereon being smaller than or equal to the number of the cold data blocks during the cold time period in the storage system, and the number of the storage units included thereon being smaller than or equal to the number of the cold data blocks during the cold time period plus a number of free blocks in the storage system; and
select the target storage device from the at least one candidate target storage device.

13. The apparatus of claim 9, the cold storage device forming unit further configured to execute one of:
selecting, from the at least one candidate target storage device, a storage device that includes a maximum number of the cold data blocks as the target storage device; and
selecting, from the at least one candidate target storage device, a storage device that has a maximum summation of the number of the cold data blocks and the number of the free blocks as the target storage device.

14. The apparatus of claim 9, the cold storage device forming unit further configured to determine a storage device that stores a maximum number of common cold data blocks in a plurality of consecutive cold time periods as a target storage device, and wherein the migration module is further configured to migrate the common cold data blocks on the other storage devices to the target storage device.

15. The apparatus of claim 9, wherein the cold time period determination unit is further configured to determine a plurality of consecutive cold time periods.

16. The apparatus of claim 9, further comprising a wake-up unit configured to set the at least one cold storage device from the low power mode to a normal work state, in response to a wake-up condition.

17. The apparatus of claim 16, wherein the wake-up condition comprises at least one of: an end of a time period corresponding to the cold time period, and an access to a cold storage device.

* * * * *